SAFETY-FIRST UNDERWATER BREATHING APPARATUS

Original Filed March 29, 1954 2 Sheets-Sheet 1

RORY E. PAGE,
INVENTOR.

BY
William C. Babcock
ATTORNEY.

SAFETY-FIRST UNDERWATER BREATHING APPARATUS

Original Filed March 29, 1954 2 Sheets-Sheet 2

RORY E. PAGE,
INVENTOR.

BY

William C. Babcock
ATTORNEY.

United States Patent Office

Re. 25,122
Reissued Feb. 13, 1962

25,122
SAFETY-FIRST UNDERWATER BREATHING APPARATUS

Rory Everett Page, Garden Grove, Calif., assignor, by mesne assignments, of one-half to Charles L. Hope and Boneva L. Hope, and one-half to Rory E. Page and Beverly Jo Page Original No. 2,823,670, dated Feb. 18, 1958, Ser. No. 419,195, Mar. 29, 1954. Application for reissue Mar. 19, 1959, Ser. No. 800,609
18 Claims. (Cl. 128—142)

Matter enclosed in heavy brackets [ ] appears in the original patent but forms no part of this reissue specification; matter printed in italics indicates the additions made by reissue.

*The present invention relates to an underwater breathing system of the open-circuit type, and which incorporates safety mechanism for alleviating the dangers attendant upon the admission of water into the system through the diver's mouthpiece.* [The present invention relates to the general field of under-water diving equipment, and more particularly to an improved breathing apparatus for use in conjunction with diving devices of the aqua-lung type. Although the aqua-lung diving apparatus distributed by U.S. Divers Co. of 1045 Broxton Avenue, West Los Angeles, California, has been developed to the extent that there is but a most remote possibility of its malfunctioning, and with the aqua-lung experienced divers have been able to descend to depths as great as 300 feet, the previously available breathing apparatus used in association therewith has been found to have several major operational disadvantages.]

*The present application is an application for reissue of United States Patent No. 2,823,670 issued February 18, 1958.*

*For the sake of clarity in the explanation of the invention it will be helpful to distinguish diving apparatus of the open-circuit type from the old-style closed-circuit system. In general, the closed-circuit system includes a chemical unit from which breathable gas is generated in accordance with the diver's requirements. Breathed gases exhaled by the diver are returned to the chemical unit, which absorbs them. Closed-circuit systems are sometimes referred to as re-breathers.*

*The open-circuit system is a more modern development and is characterized by a self-contained supply of breathable air or gas carried in a pressure vessel. Mechanism is also provided in the system for tapping off breathable air or gas from the pressure vessel at a reduced pressure level, and for supplying it at the lower pressure level in accordance with the diver's requirements. The open-circuit system is further characterized by the fact that the exhalation products are not retained in the system, but are discharged into the surrounding water through a discharge valve mechanism. Diving apparatus of the open-circuit type is often called an aqua-lung, hence the term aqua-lung will be used rather generally in the present application to identify or refer to any system of the open-circuit type.*

*The basically different modes of operation of the two types of systems are readily understood by considering the results of admitting water into the breathing apparatus. In the closed-circuit system there is no means provided for disposing of exhalation products by discharging same into the surrounding water, and there is likewise no means provided for disposing of water that is accidentally admitted into the system. The presence of water in the system is undesirable since the diver is likely to breath a certain amount of water along with the air or gas. Furthermore, the nature of the chemical unit is generally such that when water reaches the chemical unit it either*

*disturbs the normal operation of the unit for producing the desired breathable gas, or else causes the chemical unit to produce gases which are toxic to the diver. Thus, a basic premise of the closed-circuit type of diving system is that water should at all times be excluded and that the only safety protection against water which might accidentally enter the system is to prevent it from doing so.*

*In the open-circuit system, on the other hand, mechanism is included for discharging exhalation products into the surrounding water, and this same mechanism may also be used for the purpose of discharging undesired water from the system. Prior to the present invention there was a considerable risk to the diver when water entered the breathing apparatus. However, the present invention has removed substantially all danger to the diver from this source.*

*More specifically, the conventional open-circuit system includes a pressurized air supply unit as well as an associated pressure reduction mechanism. An air supply tube conducts breathable air from the air supply unit to the diver's mouthpiece, while an air discharge tube conducts exhalation products away from the mouthpiece. The discharge tube is provided with a discharge mechanism for discharging the exhalation products into the surrounding water. The mouthpiece is coupled between the air supply tube and the air discharge tube, and is simply supported in the diver's mouth by being grasped between his teeth, rather than being supported by straps from the diver's head as is the face mask of the closed-circuit system.*

*In using the open-circuit system it frequently happens that the diver momentarily loses control of his mouthpiece, with the result that water is admitted through the air compartment of the mouthpiece into the air supply tube and the air discharge tube. It is the danger resulting from such accidental or inadvertent admission of water into the system which the safety mechanism of the present invention is designed to alleviate.*

*Expelling water from the open-circuit system was a difficult task which, prior to the present invention, could be accomplished only by the most expert divers. Failure to expel water from the system created a hazard in that the diver in the act of inhaling air was likely to take water into his lungs along with the air. Experienced divers simply accepted the fact that there was a certain danger of drowning when the undesired water was present within the breathing apparatus. For inexperienced divers this danger was even greater. Particularly if an inexperienced diver became exhausted or frightened upon losing his mouthpiece, he was likely to drown before being able to restore the normal operation of the breathing equipment.*

[In using the aqua-lung the diver breathes through a mouthpiece which is part of a tubular T-shaped member, the oppositely disposed legs of which are connected to a source of air and to an air discharge tube respectively. Occasionally in the past a diver has inadvertently dropped or had the mouthpiece displaced from his mouth while submerged, whereby the mouthpiece becomes filled with water.] It is extremely difficult for even the most skilled diver to remove the water from the mouthpiece by blowing. The hoses used in supplying air to and permitting air to be discharged from the mouthpiece are of an annular corrugated construction, and water tends to remain in the depressed portions thereof. [Even if a diver is aware of the presence of water in the hoses, he may inadvertently draw a portion of the water into his mouth when he inhales, which causes him to choke or cough. Such choking or coughing may result in displacement of the mouthpiece from the diver's mouth to again become filled with water, thus augmenting a serious situation which has endangered and may have been the cause of the loss of a number of lives.]

[A further operational disadvantage of previously available aqua-lung apparatus resides in the fact that as the diver exhales, the exhaled air carries an appreciable percentage of carbon dioxide therewith which to a degree is mixed with fresh incoming air, and this mixture is then inhaled by the diver. Thus, in using such equipment the diver at no time is able to use the aqua-lug to its maximum efficiency, for the pure air discharged from the pressure cylinder associated therewith is contaminated by exhaled carbon dioxide before the diver has an opportunity to breathe the same. The degree of such contamination is not known, but it is known that in dives of greater than thirty-three feet deep, if the carbon dioxide present in the incoming air exceeds a certain percentage, it is lethal.]

*It is, therefore, an object of the invention to provide an open-circuit diving system which is safe for the diver despite the presence of water in the system.*

*Another object of the invention is to provide an open-circuit diving system from which undesired water may be readily expelled by the diver simply by breathing into the mouthpiece.*

*An additional object of the invention is to provide an open-circuit diving system which can be concurrently used by two or more divers, by swapping the mouthpiece back and forth from one diver to the other, thus providing safety protection for one of the divers whose equipment may have become inoperable due to either an external or an internal cause.*

*A further object of the invention is to provide additional safety protection in an open-circuit diving system in the event that the discharge mechanism, utilized for discharging exhalation products, should become damaged.*

*Yet another object of the invention is to provide a safety-first underwater breathing apparatus which is inexpensive, simple in operation, and easily disassembled for purpose of inspection or repair.*

[The major object of the present invention is to provide a breathing apparatus for use with underwater equipment which may be removed from the diver's mouth under water, yet when the diver blows into the mouthpiece thereof, the water contained therein may be displaced therefrom.]

[Other objects of the invention are to provide a breathing apparatus of the character described that eliminates substantially all possibility of the incoming air becoming contaminated by the carbon dioxide contained in exhaled air; permits unimpaired operation of the aqua-lung equipment associated therewith should the flipper valve thereof be damaged or displaced therefrom; permits dives of long duration to be made in that additional aqua-lung units may be lowered to the diver as his air supply becomes depleted; eliminates the annoyance and inconvenience to the diver caused by gurgling of water in the equipment hoses; and which removes the element of fear experienced by many divers in anticipating that the breathing apparatus might be dislodged and become filled with water.]

[A further object of the invention is to supply a breathing apparatus for divers that is extremely simple in operation, may be readily assembled and disassembled to permit easy check on the operating condition of the component parts thereof, and may be fabricated from standard commercially available materials whereby it can be retailed in the medium-priced merchandising field.]

[Yet another object of the invention is to supply a breathing apparatus that is foolproof, and which operates in such a manner that should the emergency arise, several divers could alternately use the same mouthpiece for breathing when under water.]

[A still further object of the invention is to furnish a diving apparatus that is extremely safe in operation and eliminates substantially all of the remaining hazards of diving with equipment of the aqua-lung type.]

*In accordance with a first basic feature of the invention a unidirectional valve mechanism is provided on the inlet side of the mouthpiece, between the mouthpiece breathing compartment and the air supply tube. This first valve mechanism prevents water which enters the mouthpiece breathing compartment from getting into the air supply tube. At the same time, normal breathing usage of the apparatus is not interfered with.*

*In accordance with a second basic feature of the invention a unidirectional valve mechanism is provided on the outlet side of the mouthpiece, between the mouthpiece breathing compartment and the air discharge tube. This second valve mechanism prohibits water which has gotten into the air discharge tube from flowing back into the breathing compartment of the mouthpiece. Although such water is present within the system, it is not dangerous to the diver, and hence need not be removed from the system.*

*Thus the invention in its preferred form utilizes a pair of unidirectional valve mechanisms, one on each side of the mouthpiece breathing compartment. The only water which presents a safety problem, therefore, is the water which occupies the breathing compartment of the mouthpiece, and which the diver upon regaining control of his mouthpiece must dispose of before resuming normal breathing. The volume of this breathing compartment is made small, relative to the lung capacity of the diver, so that even an exhausted diver has sufficient air remaining in his lungs to force the undesired water into the air discharge tube where it can no longer create any danger.*

*Thus, a diving system which was formerly not safe even for expert divers is now safe for the novice.*

[These] *The foregoing* and other objects and advantages of the invention will become apparent from the following description of a preferred and alternate forms thereof, and from the drawings illustrating [these inventions] *the invention,* in which.

Figure 9:
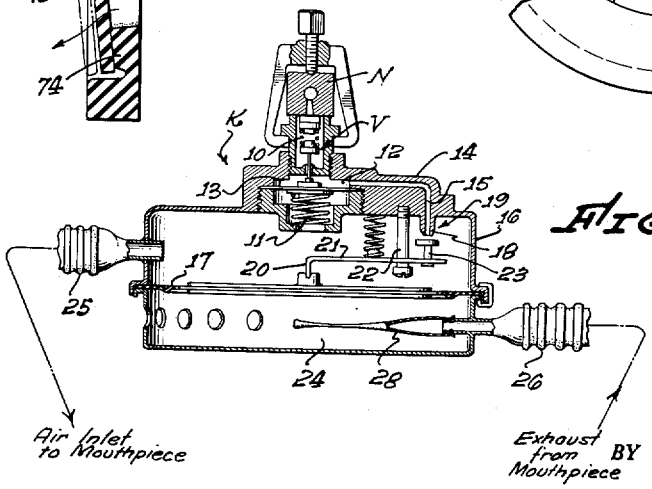
FIGURE 9 is a vertical cross-sectional view of an aqua-lung taken along line 9—9 of FIGURE 1.

Diving apparaus of the aqua-lung type has three major parts: a bottle of air compressed to 150 atmospheres which is normally strapped to the diver's back; a two-stage pressure reduction mechanism which automatically supplies air on demand to the diver at a pressure equal to that of the water surrounding him, the structure of which is shown in FIGURE 9; and a loop of flexible tubing leading out of and back into the pressure reduction mechanism, through which tube the diver inhales and exhales by means of the breathing apparatus. The present-day aqua-lung differs from earlier compressed air devices that relied on manually controlled valves and a continuous wasteful flow of air for operation thereof, in that an ingenious two-stage air pressure regulator is employed therewith, which forms no part of the present invention. However, an understanding of the manner in which this regulator operates is essential to a full comprehension of the novelty of the present breathing apparatus.

Figure 1:
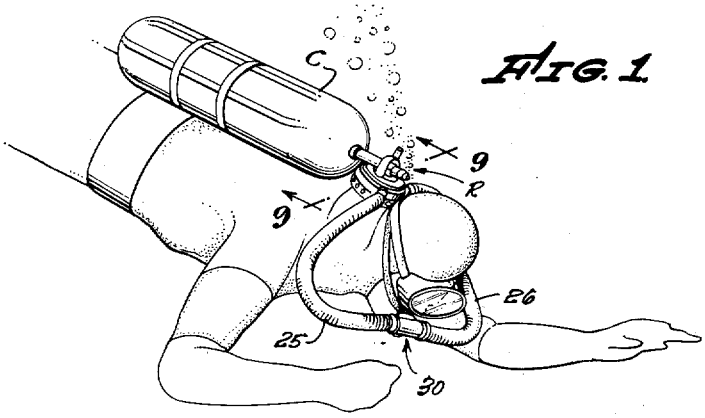
FIGURE 1 is a perspective view of [the present invention in position on an aqua-lung unit] *an aqua-lung as modified by the present invention;*

Although the detailed structure of the present-day aqua-lung may differ slightly from the form shown in FIGURE 9, the essential operation of both devices is the same. The aqua-lung regulator R shown includes a nozzle N to which air at 3000 pounds pressure to the square inch is delivered from a suitable cylinder C as shown in FIGURE 1. A two-stage pressure reducing valve V, actuated by two springs 10 and 11, admits air into a chamber 12 defined by a diaphragm 13 and the interior surface of a housing 14. Air is delivered into this chamber at a slightly higher pressure than that of the water surrounding the device.

Air passage 15 extends through housing 14 to a relatively large air reservoir 16 situated therebelow. The lower end of the air reservoir is closed by a resilient diaphragm 17, the exterior surface of which contacts the water surrounding the diver. Passage 15 terminates in a port 18 forming a part of a demand valve 19. The balance of the demand valve is formed by an L-shaped member that has one leg 20 normally disposed to the interior center portion of diaphragm 17 and affixed thereto, and another leg 21 positioned substantially parallel to the diaphragm is pivotally supported at an intermediate position by a rigid member 22 that depends into the reservoir from housing 14. As pressure of the water contacting the surface of diaphragm 17 increases, the diaphragm deforms inwardly to pivot leg 21 in a clockwise direction to separate a valve member 23 mounted on the free extremity thereof from engagement with port 18. Air then flows into the reservoir through port 18 until the air pressure within the reservoir is slightly in excess of the water pressure on the exterior surface of diaphragm 17.

A second chamber 24 having perforated sidewalls is situated below the reservoir 16. A first length of flexible tubing 25 extends outwardly from reservoir 16 and is in communication with the breathing apparatus, which apparatus is also connected to a second length of tubing 26 that extends to the interior of the perforated chamber. In previously available aqua-lung equipment a portion of the diver's exhaled breath would pass through tube 26, and the balance thereof, contaminated with carbon dioxide, would mix with fresh air flowing to the breathing apparatus through tube 25, but in the present invention, exhaled air is discharged through tube 26 only. An exhale valve 28, or flipper valve as it is sometimes referred to, is formed from resilient, thin-walled material, and mounted on the discharge end of tube 26 positioned within the confines of the perforated chamber. Valve 28 prevents upward flow of water in tube 26 when the pressure therein is lowered when the diver breathes.

As a diver inhales through the aqua-lung mouthpiece, the pressure within reservoir 16 is reduced whereby the diaphragm 17 is deformed inwardly due to the surrounding water pressure, to open port 18. Air is then discharged through passage 15 into reservoir 16 until the air pressure is slightly greater than that of the water on the exterior of the diaphragm, and the diaphragm is deformed outwardly to cause valve member 23 to pivot in a counter clockwise direction until it again engages port 18 and prevents further discharge of air therefrom.

Figure 2:
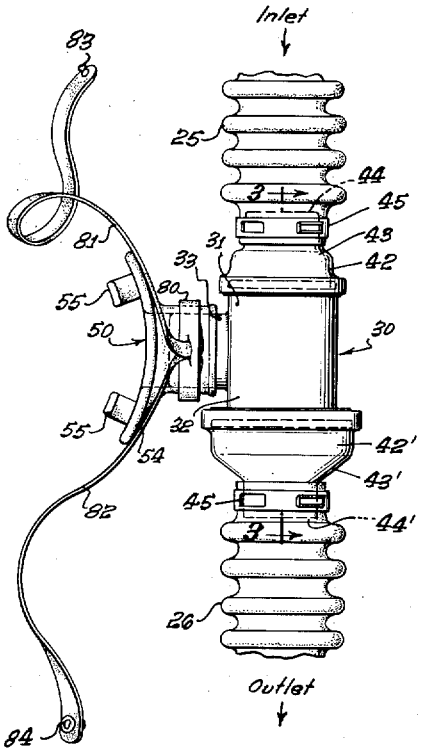
FIGURE 2 is a plan view of the breathing apparatus.
Figure 3:
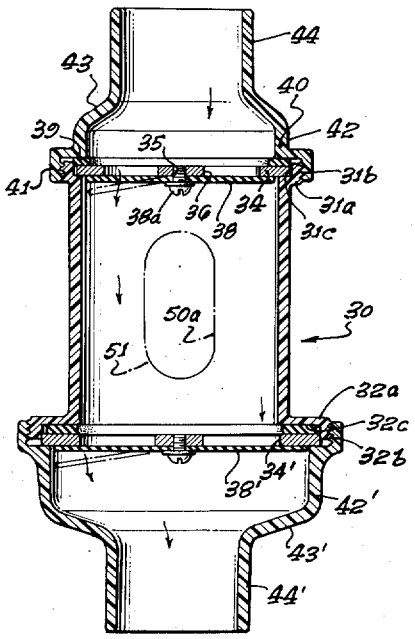
FIGURE 3 is a vertical cross-sectional view of the breathing apparatus taken on the line 3—3 of FIGURE 2.
Figure 4:
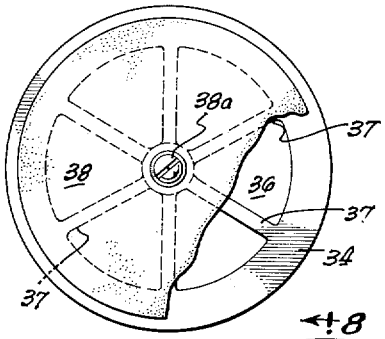
FIGURE 4 is an elevational view of one form of valve utilized in conjunction with the present invention.

The structural details of the presently preferred embodiment of the breathing apparatus of the present invention, which eliminates *the dangerous effects of water entering the sytem* [appreciable intermingling of fresh air and contaminated air], may best be seen in FIGURES 2 and 3. The device includes a *relatively rigid* tubular T-shaped member generally designated by the numeral 30, that has two oppositely disposed legs 31 and 32, and a third leg 33 normally disposed thereto and in communication therewith. T 30 may be fabricated from metal, plastic or any desired material that is not subject to corrosion when exposed to salt water, and which will not break or fracture when subjected to physical shock. Leg 31, as may best be seen in FIGURE 3, has a flange 31a extending outwardly from the end portion thereof, on which flange threads 31b are formed on the exterior circumferential surface thereof. Similarly, a leg 32 is provided with a flange 32a embodying threads 32b on the outer circumference thereof. Flanges 31a and 32a are formed with annular recesses 31c and 32c, respectively. The dimensions of recess 31c are such as to accommodate the outer peripheral portion of a circular and relatively thin valve body 34 in which a centrally disposed longitudinal tapped bore 35 is formed. Valve body 34 is provided with a plurality of ports 36 which are preferably spaced around the central portion thereof in a selected pattern. One pattern which has proved most successful in practice is to position ports of triangular configuration in side-by-side relationship whereby the adjacent edges of the ports define a number of radially disposed legs 37 extending from the center of the valve body to the circumferential portion thereof, as shown in FIGURE 4.

A circular valve member 38 formed from a resilient sheet material is provided, the diameter of which is such that the circumferential edge thereof is adjacent to, but does not contact the interior surface of tubular leg 31, as may best be seen in FIGURE 3. Valve member 38 is affixed to the interior face of valve body 34 by means of a screw 38a which extends through an opening in the valve member to engage the tapped bore 35. Valve body 34, together with a resilient gasket 39, are rigidly held within the confines of recess 31c due to contact with a circumferentially extending body shoulder 40 formed in a tapped flange 41 that removably engages threads 31b. A tubular portion 42 extends from flange 41, to form a tapered section 43 and develops at the lower extremity thereof into a tube 44 of smaller diameter than tubular portion 42. Tube 44 is of such external diameter as to permit slidable insertion thereof within the confines of the outer free extremity of tube 25, and the two tubes are rigidly held together by an encircling clamp 45 of conventional design, of the type employed in making hose connections.

It will be noted in FIGURE 3 that with the valve body and member disposed in the tubular T as shown, that air may flow from tube 44 into the confines of the T when the valve member 38 moves inwardly to the position shown in phantom lines, but that movement of air from the confines of the T back into tube 44 is prevented in this particular valving arrangement. The importance of this arrangement of the valve will be described in detail hereinafter.

In FIGURE 2 it will be noted that the flange 32a of leg 32 is considerably larger in diameter than flange 31a, but is provided with a second valve identical to the valve previously described, except that it is of larger diameter in order that it may fit in recess 32c. Threads 32b on the flange are engaged by an internally tapped tubular member of the same general structure as the one associated with the opposite leg of the tubular T. The structure of the second valve and the associated tubular member mounted in recess 32b need not be described due to its similarity to the one previously described. As a result of this similarity, corresponding parts of the second valve and tubular member will be identified by the same numerals used in identifying component parts of the first valve and tubular member, but with a prime added thereto.

It will be particularly noted in FIGURE 3 that the outer edge portions *of the ports* [36'] *corresponding to ports 36 in valve body 34 of the valve body 34'* are flush with the interior surface of the [legs 31 and] *leg* 32 to permit water that may have entered the confines of tubular member 30 to flow therefrom with a minimum of interference through the valve body 34' and past the valve member 38'. The valve member 38' is so disposed that both water and air can flow from the tubular member 30 into the hose 26, but cannot re-enter the tubular member 30 from the hose.

In FIGURES 2 and 3 it will be seen that the leg 33 with which the mouthpiece 50 communicates, has a cross section that is elongate in the same direction as the longitudinal axes of legs 31 and 32. Furthermore, this interior cross section of leg 33, which in FIGURE 3 is identified by the numeral 50a, is disposed mid-way on one side of tubular T 30 to minimize the possibility of water flowing therein should it enter the confines of the T. The mouthpiece 50 mounted on the outer extremity of leg 33, includes an elongate curved flange 54 which engages the diver's lips and portions of the cheeks when he holds the mouthpiece by gripping two laterally spaced outwardly extending members 55 between his teeth. This breathing apparatus is used in the same manner as apparatus formerly supplied with the present aqua-lung equipment.

As the diver inhales, the pressure is lowered momentarily in tubular member 30 between the valve members 38 and 38'. This lower air pressure creates a greater differential between it and the air pressure existing on the exterior surface of valve member 38', whereby member 38' is forced into tighter sealing contact with valve body 34' than before to effect a fluid-tight seal therewith and prevent entry of any water that may have been discharged into tubular member 42', 44' or the flexible tube 26. However, this momentary lowering of the air pressure in the confined space between the valve members 38 and 38' has a completely different action on the valve member 38, in that this valve member tends to move inwardly to the position shown in phantom line in FIGURE 3 to permit air to pass from tube 25 into the confined space and equalize the pressure.

The valve member 38 has a certain amount of resiliency, and tends at all time, unless subjected to a deforming force, to remain in a plane parallel to that of the exterior surface of the valve body 34 in which position the valve member is in fluid sealing contact therewith. Air flowing from the flexible tube 25 into the confined space between the valve members 38 and 38' to equalize the pressure, momentarily causes lowering of the air pressure in tube 25. As pressure in the tube 25 lowers, air flows from the reservoir 16 to equalize the pressure in the tube, whereby the air pressure in the reservoir is lowered, causing the diaphragm 17 to be deformed inwardly due to the pressure of the water in contact with the exterior surface thereof and this movement of the diaphragm results in separation of the valve member 23 from the port 18 and air is then discharged from port 18 into the reservoir until a pressure is attained therein that is slightly higher than that on the water contacting the exterior surface of the diaphragm 17. When the reservoir pressure rises above the water pressure against diaphragm 17, the diaphragm deforms outwardly and pivots the arm 21 in a counter-clockwise direction to return valve member 23 into a sealing position with port 18. Valve member 23 when thus disposed prevents further discharge of air through reservoir 16 until the pressure therein is again lowered when the diver breathes, and the above described cycle is repeated.

The diver than exhales the air he has inhaled, which of course contains carbon dioxide. With the previously available diving equipment a portion of such exhaled air would enter tube 25 although the major portion would be discharged from tube 26. However, in the breathing apparatus of the present invention when air is exhaled into the confines of tubular T 30, the air pressure therein increases, creating a pressure differential between it and the air on the side of diaphragm 38' within the confines of tubular members 40', 44' and flexible tube 46. This differential in pressures causes the valve member 38' to momentarily deform outwardly to assume the position shown in phantom line in FIGURE 3, and permit passage of exhaled air through the port in valve body 34' to tube 26, where it in turn flows to the exhale valve forming a part of the aqua-lung equipment.

As the air pressure in the tubular T 30 increases due to exhaling on the part of the user of the invention it can flow in only one direction, and that through the valve body ports 36' past the valve member 38'. It is impossible for water or air to enter tube 25 as the diver exhales, for any increase in pressure in the confined space between the two valve members 38 and 38' simply increases the pressure differential between the interior face of valve member 38 and the exterior face thereof. This increase of pressure differential between the two valve members 38 and 38' simply increases the force with which the valve member 38 engages the interior face of valve body 34, to increase the efficiency of the sealing contact made therewith.

From the above description it will be seen that substantially all of the carbon dioxide exhaled by a diver is discharged past the valve member 38', before the valve member 38 is deformed inwardly to permit entrance of fresh air from tube 25 into the confines of tubular T 30 for subsequent withdrawal through the mouthpiece leg 33 into the diver's mouth. A diver is thus able to utilize the quantity of air in the cylinder associated with the aqua-lung equipment at substantially maximum efficiency that may be achieved therewith.

*In the several immediately preceding paragraphs the normal operation of my improved underwater diving system has been described. That is, the flow of air in the system during its normal usage by the diver has been described in detail, and it has been explained in detail how and wherein the novel structural features provided by the present invention result in improved efficiency of the system. Far more important, however, is the improved operation which is brought about by the present invention during the abnormal or unexpected usage of the system. Thus, in the situation where the diver loses contact with his mouthpiece, and subsequently recaptures it, the improved performance provided by the present invention, as compared to previously known systems, is of vital significance.*

*In previously known systems of the aqua-lung type, when the diver lost his mouthpiece it was possible for water to enter not only the breathing compartment immediately associated with the mouthpiece but also to enter the air inlet tube 25 and the air discharge tube 26. When the diver regained his mouthpiece and applied air pressure to the system by blowing into the mouthpiece, the water located in air discharge tube 26 and in the mouthpiece breathing compartment could be largely disposed of through the discharge valve 28. Water which had entered the air inlet tube 25 could not be gotten rid of, however, but remained in the system to imperil subsequent breathing of the diver. Furthermore, the total volume of air discharge tube 26 and of the mouthpiece breathing compartment was such that an exhausted diver might not be able to expel sufficient air to dispose of all the water contained therein.*

*The present invention provides a complete solution to the above problem. Inclusion of valve 38 in the system between air inlet tube 25 and the mouthpiece breathing compartment provides assurance that, when the diver loses his mouthpiece and water enters therein, the water will be entirely precluded from flowing into air inlet tube 25. Thus, valve 38 avoids the difficulty of getting water into the system in a portion thereof such that the diver is completely helpless in trying to eject it.*

*Furthermore, with respect to air discharge tube 26 and the mouthpiece breathing compartment, in prior systems it was conceivable that a very small amount of water entering the mouthpiece could be forced by the exhalation of the diver to the far end of air discharge tube 26,*

*adjacent discharge valve 28, but that upon the next inhalation by the diver this residual water might be drawn either by air pressure, gravity flow or the dynamic movement of the system, or a combination of these factors, back to the mouthpiece and hence into the diver's lungs. The provision in accordance with the present invention of valve 38' between the mouthpiece and the input end of air discharge tube 26 substantially eliminates the above problem. In using the improved system provided by the present invention it is not necessary that water entering the mouthpiece be completely eliminated from the system to avoid interfering with safe breathing by the diver, but it is only necessary that the water be ejected out of the mouthpiece breathing compartment and through valve 38' into the air discharge tube.*

*It may be readily demonstrated that this improved operation which the present invention provides constitutes a difference in kind rather than merely a difference in degree. The lung capacity of the normal adult person is approximately 8 to 10 liters of air. A person who has inhaled fully can expel, by exhaling a normal amount, approximately 3 to 4 liters, of air and other gases. After such normal exhalation the average adult is still capable of forcibly expelling about 1 to 2 additional liters of air or gas, when confronted with an emergency which so requires. The remaining air or gas contained in the lungs cannot be exhaled, even forcibly, or else the lungs will collapse. Thus, an exhausted diver who loses his mouthpiece is ordinarily capable of exhaling 1 liter of air or gas upon recovering the mouthpiece. Since the size and volume of the mouthpiece breathing compartment, air inlet tube, and air discharge tube are established to conform to the physical proportions of the person by whom the apparatus is to be used, it can be shown by simple calculation that a diver recovering his lost mouthpiece cannot safely rely on being able to expel water both from the mouthpiece breathing compartment and also from the air discharge tube. On the other hand, by using the improved system provided by the present invention, he can safely rely on expelling water from the breathing compartment alone, hence the previously existing danger of drowning is substantially eliminated.*

Figure 5:
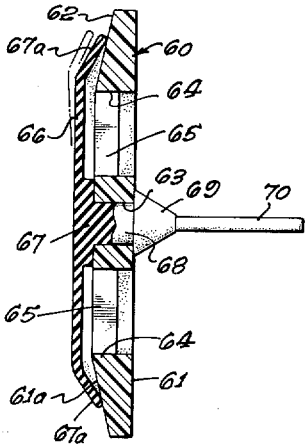
FIGURE 5 is a vertical cross-sectional view of an alternate form of valve.
Figure 6:
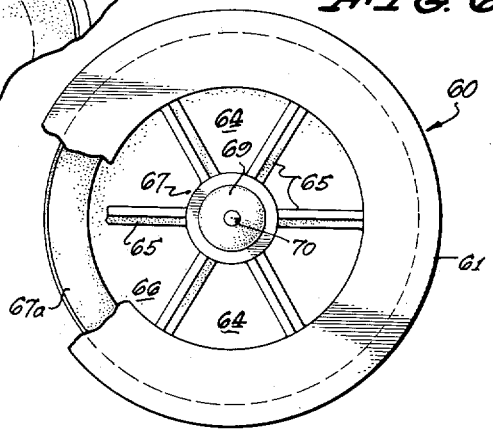
FIGURE 6 is a side elevational view of the valve shown in FIGURE 5 with a portion of the valve body cut away to show the structure of the valve member.

Although the circular valve body 34 and valve member 38 previously described have been found from experience to be quite satisfactory in use, it is possible to use valves of different design with the breathing apparatus and secure equally good results therewith. One such alternate form is shown in FIGURES 5 and 6. A circular rigid plate-like valve body 60 is provided that has one flat face 61, and an oppositely disposed flat face 61a formed with a circumferentially extending portion 62 which tapers outwardly and inwardly toward face 60. A central longitudinally extending bore 63 is formed in the valve body (FIGURE 5), as well as a number of triangularly-shaped ports 64 disposed around the bore 63 in a predetermined pattern to define a number of radially extending legs 65. A valve member 66 is provided, the central portion of which is of greater thickness than the balance thereof, generally designated 67. Valve member 66 includes a circular sheet of resilient material in which a circumferentially extending portion 67a is formed that tapers outwardly and inwardly toward the face 62 of the valve member. A neck 68 projects from portion 67, which neck has a slightly conical enlargement formed on the outer portion thereof that serves as a stop to hold valve 66 in the desired position on the valve body 60 after enlargement 69 has been drawn through bore 63 to the position shown in FIGURE 5. The valve shown in FIGURES 5 and 6 is used in precisely the same manner in the breathing apparatus as the valve shown in FIGURES 2 and 3.

Figure 7:
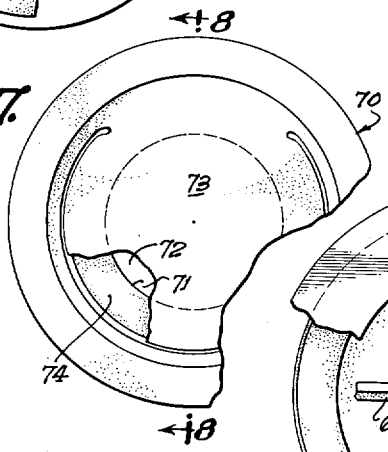
FIGURE 7 is a side elevational view of an alternate form of valve.
Figure 8:
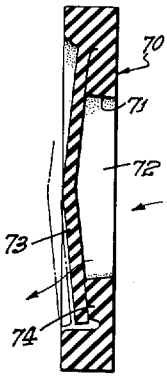
FIGURE 8 is a vertical cross-sectional view of the alternate form of valve shown in FIGURE 7 taken on the line 8—8 thereof.

A third alternate form of valve adapted for use in conjunction with the present invention is disclosed in FIGURES 7 and 8. This valve may be formed as an integral unit, and includes a ring-like body 70 of approximate size to fit into either the recesses 31c or 32c. The inner circumferential surface 71 of the ring defines a circular opening 72 that is normally closed by a U-shaped flap 73 that depends from the upper portion of the ring, with the inner peripheral portion of the flap adapted to movably engage a recessed complementary seat 74 formed in a portion of valve body 70. The valve shown in FIGURES 7 and 8 is adapted for use with the breathing apparatus shown in FIGURES 2 and 3 in the same manner as the valves disclosed therein.

The operation and use of the invention has been described in detail in connection with the form of the valve shown in FIGURES 2 and 3 and need not be repeated as to the second and third alternate types disclosed in FIGURES 5 to 8 inclusive. In the use of breathing apparatus shown in FIGURES 2 and 3, it has been found convenient to provide a ring 80 that extends along the exterior surface of the tubular leg 33, to which two outwardly extending flexible strips 81 and 82 are affixed. These strips may be fabricated of any flexible material that is not adversely affected by sea water. Each strip is provided with complementary fastening means 83 and 84 on the ends thereof whereby they may be placed in an encircling position around the neck and held in position when the fastening means are engaged. Encircling strips 81 and 82 prevents movement of the mouthpiece beyond a certain predetermined distance from the mouth, should it become inadvertently dislodged during the diving operation.

Although the breathing apparatus herein shown and described is fully capable of achieving the objects and providing the advantages hereinbefore mentioned, it is to be understood that it is merely illustrative of the presently preferred embodiments of the invention, and that there is no intention of limiting the patent protection sought to the details of construction other than as defined in the appended claims.

I claim:

1. Underwater breathing apparatus adapted for use with air supply and air discharge tubes from which water may be completely discharged when submerged which includes: a tubular T having first and second coaxially aligned legs, and a third leg disposed substantially normal thereto; first and second ring-shaped flanges extending outwardly from the extremities of said first and second legs respectively, which flanges are provided with threads on the outer circumferential portions thereof, and recesses that extend outwardly from the inner circumferential edges thereof to define first and second body shoulders respectively; a first circular valve body in which a plurality of ports are formed, said body being adapted to be removably positioned in said first recess; a first valve member associated with said first valve body that only permits fluid flow into said tubular member when the air pressure on the interior of said T is lower than that on the exterior thereof; a second circular valve body in which a plurality of ports are formed, which is adapted to be removably disposed in said second recess, with said ports extending outwardly beyond the inner surface of said second leg to permit discharge of all water entering said T to pass therethrough; a second valve member associated with said second valve body that only permits flow of air and water through said ports in said second body when the air pressure within said T is greater than that on the exterior thereof; first threaded means which removably engage said threads of said first flange to hold said first valve body in fluid-sealing contact with said first body shoulder, said air supply tube communicating with said ports in said first valve body; second threaded means which removably engage said threads of said second flange to hold said second valve body in fluid-sealing contact with said second body shoulder and said air discharge tube; and a mouthpiece affixed to the extremity of said third leg to permit said apparatus to be held in a breathing position by a diver.

2. An underwater breathing apparatus as defined in claim 1, said first and second valve members of which are circular sheets of a resilient material removably disposed on the interior face of said first valve body and the exterior face of said second valve body and normally effect a fluid-tight seal therewith.

3. An underwater breathing apparatus as defined in claim 1, said first and second valve members of which are circular sheets of a resilient material removably disposed on the interior face of said first valve body and the exterior face of said second valve body, with said second valve member being larger in diameter than said first valve member and extending outwardly beyond the interior surface of said second leg.

4. An underwater breathing apparatus as defined in claim 1, said first and second valve bodies of which have centrally disposed, longitudinally extending bores formed therein, and said first and second valve members are circular sheets having projecting portions adapted to be removably disposed in said bores to hold said first sheet in fluid-sealing contact with the interior face of said first valve body, and said second sheet in fluid-sealing contact with the exterior face of said second valve body, said first and second valve members normally being in fluid-tight contact with said first and second valve bodies, respectively.

5. An underwater breathing apparatus comprising, in combination: an air supply tube; an air discharge tube; a T-shaped tubular member having first and second coaxially aligned legs, and a third leg disposed substantially normal thereto; first and second ring-shaped flanges extending outwardly from the extremities of said first and second legs, respectively, which flanges are provided with recesses that extend outwardly from the inner circumferential edges thereof to define first and second body shoulders, respectively; first and second circular valve bodies in each of which a plurality of ports are formed, each valve body having a circular longitudinally extending bore formed therein, said first and second valve bodies being adapted to be removably disposed within said first and second recesses, respectively, in removable engagement with the respective body shoulders thereof; first and second circular valve members made of resilient sheet material and associated with said first and second valve bodies, respectively; first and second valve necks associated with said valve members, respectviely, each valve neck extending normally outward from the associated valve member at substantially the center thereof and having a conical enlargement formed on the outer portion thereof, each valve neck being disposed within the bore of the associated valve body so that the conical enlargement thereof is on the opposite side of the valve body from the associated valve member; means connecting said air supply tube to said first flange in communication with the ports in said first valve body, said first valve member being positioned on the side of said first valve body which faces toward the interior of said T-shaped tubular member to normally cover said ports in said first valve body; means connecting said air discharge tube to said second flange, said second valve member being positioned on the side of said second valve body which faces toward said air discharge tube so as to normally cover the ports in said second valve body; and a mouthpiece affixed to the extremity of said third leg to permit said apparatus to be held in a breathing position by a diver.

6. An underwater breathing apparatus as defined in claim 5 wherein each of said valve bodies includes six ports defining six radially disposed legs.

7. An underwater breathing apparatus as claimed in claim 5 which also includes means for supplying air to said air supply tube at a regulated pressure which is measurably greater than the pressure then existing within said air discharge tube.

8. Underwater breathing apparatus from which apparatus water may be completely discharged while submerged when subjected to air pressure, which includes: first and second pressure sensitive valves each formed from a ring of solid material from which a resilient flap depends and normally effects a fluid-tight seal with a curved recessed valve seat formed on the side portion of said ring on which said flap is positioned; a tubular body formed with a centrally disposed port, said valves closing the ends of said body on opposite sides of said port to cooperatively define a compartment, said first valve permitting flow of air into said compartment only when the pressure on the upstream side of said valve is greater than that on the downstream side thereof, said second valve so disposed as to permit ejection of all water entering said tubular body therethrough into an air discharge tube, and said second valve permitting flow of air and water from said compartment only when the pressure on the upstream side thereof is higher than that on the downstream side thereof; breathing means communicating with said compartment through said port of said body; means to removably connect an air supply tube to said body communicating with said first valve; and means to removably connect said air discharge tube to said body communicating with said second valve.

9. Underwater breathing apparatus from which apparatus water may be completely discharged while submerged when subjected to air pressure, which includes: first and second pressure sensitive valves each formed from a circular thin valve body having a plurality of ports spaced around the center portion thereof, and a circular valve member formed from a sheet of resilient material that is held against one side of said body by fastening means that engage both said [member] *body* and said central portion of said valve member, and said valve member normally occupying a fluid-sealing position with said valve body; a tubular body formed with a centrally disposed port, said valves closing the ends of said body on opposite sides of said port to cooperatively define a compartment, said first valve permitting flow of air into said compartment only when the pressure on the upstream side of said valve is greater than that on the downstream side thereof, said second valve so disposed as to permit ejection of all water entering said tubular body therethrough into an air discharge tube, and said second valve permitting flow of air and water from said compartment only when the pressure on the upstream side thereof is higher than that on the downstream side thereof; breathing means communicating with said compartment through said port of said body; means to removably connect an air supply tube to said body communicating with said first valve; and means to removably connect said air discharge tube to said body communicating with said second valve.

10. Underwater breathing apparatus from which apparatus water may be completely discharged while submerged when subjected to air pressure, which includes: first and second pressure sensitive valves each formed from a circular thin valve body having a downwardly and outwardly tapered circumferentially disposed side portion, and a plurality of ports spaced around the center portion thereof, and a circular valve member formed from resilient sheet material but of such rigidity that a circumferentially extending tapered lip portion may be formed therein, said valve member being provided with a centrally disposed elongate stem projecting outwardly therefrom in the same direction as said lip, said stem being adapted to support said member on said valve body by removably engaging a bore formed in said central portion of said valve member, and said lip normally engaging said tapered side portion to effect a fluid-tight seal therewith; a tubular body formed with a centrally disposed port, said valves closing the ends of said body on opposite sides of said port to cooperatively define a compartment, said first valve permitting flow of air into said compartment only when the pressure on the upstream side of said valve is greater than that on the downstream side thereof, said second valve being so disposed as to permit ejection of all water entering said tubular body therethrough into an air discharge tube, and said second valve permitting flow of air and water from said compartment only when the pressure on the upstream side thereof is higher than that on the downstream side thereof; breathing means communicating with said compartment through said port of said body; means to removably connect an air supply tube to said body communicating with said first valve; and means to removably connect said air discharge tube to said body communicating with said second valve.

*11. An underwater breathing system of the type in which breathable gas to be breathed by a diver is maintained under pressure and is supplied in accordance with the inhalation demands of the diver at a pressure level slightly above ambient pressure, and in which substantially all the gas exhaled upon each exhalation of the diver is immediately discharged into the surrounding water without any recirculation thereof within the system, said system comprising: a container for compressed gas; a pressure reducing and pressure regulating mechanism coupled to said container; a flexible air supply tube having one end thereof coupled to said pressure reducing and regulating mechanism, the operation of said pressure reducing and pressure regulating mechanism being such as to selectively supply gas from said container to said air supply tube at a pressure slightly above ambient pressure; a flexible air discharge tube having one end thereof coupled to said pressure reducing and regulating mechanism; a discharge valve on said one end of said air discharge tube; a hollow body having first, second and third openings therein, the other end of said air supply tube communicating with said first opening, the other end of said air discharge tube communicating with said second opening; a mouthpiece adapted to be removably held in the diver's mouth and communicating with said third opening; a first pressure-sensitive unidirectional valve supported from said hollow body in a position to selectively close said first opening, and operable both to permit unused gas to flow from said air supply tube into said hollow body, and to inhibit flow of either water or gas in the reverse direction; and a second pressure-sensitive unidirectional valve supported from said hollow body in a position to selectively close said second opening, and operable to permit either water or gas to flow from said hollow body into said air discharge tube while inhibiting their flow in the opposite direction; said first and second valves and said hollow body together defining a compartment whose volume is relatively small compared to the combined volume of said air supply and air discharge tubes.*

*12. An underwater breathing system as claimed in claim 12 in which each of said valves includes a relasageway means extending substantially entirely across said second opening whereby the application of air pressure to said mouthpiece by a submerged diver is sufficient to force substantially the entire amount of any water contained in said compartment to flow through said second valve into said air discharge tube, thus permitting the inhalation by the diver of a fresh supply of breathable gas from said air supply tube via said first valve.*

*13. An underwater breathing system as claimed in claim 12 in which each of said valves includes a relatively rigid valve body that is transversely disposed within the corresponding opening of said hollow body and firmly supported thereby in fluid-sealing contact therewith, and a valve member movably supported from said valve body.*

*14. An underwater breathing system as claimed in claim 12 in which said hollow body is a tubular T-shaped member having first and second legs whose ends provide said first and second openings, respectively, and a centrally disposed port providing said third opening; and in which each of said valves includes a relatively rigid, circular thin valve body which is transversely disposed within the corresponding leg end and firmly supported thereby in fluid-sealing contact therewith, said valve body*

*having at least one fluid passage provided therein, and a valve member normally occupying a fluid-sealing position with said valve body.*

*15. An underawter breathing system as claimed in claim 14 in which each of said valve bodies has a plurality of ports spaced around the center portion thereof, and each of said valve members is formed from a sheet of resilient material that is held against one side of the corresponding valve body by fastening means that engage both said member and said central portion of said valve body.*

*16. An underwater breathing system as claimed in claim 14 in which each of said leg ends is recessed on its inner circumferential edge to define a body shoulder, and each of said valve bodies is removably disposed within a corresponding one of said recesses in engagement with the body shoulder thereof, each leg end being adapted to be removably engaged about its outer circumferential surface for coupling the associated air tube end thereto.*

*17. An underwater breathing system of the type in which breathable gas is supplied to a diver in accordance with his inhalation demands and in which upon each exhalation of the diver substantially all the exhaled gas is immediately discharged into the surrounding water without any circulation thereof within the system, said system comprising: a container for compressed gas; a pressure reducing and regulating mechanism coupled to said container; a flexible air supply tube having one end thereof coupled to said pressure reducing and regulating mechanism, the operation of said pressure reducing and regulating mechanism being such as to selectively supply gas from said container to said air supply tube at a pressure slightly above ambient pressure; a flexible air discharge tube having one end thereof coupled to said pressure reducing and regulating mechanism; a discharge valve on said one end of said air discharge tube; a hollow body having first and second tubular legs with open outer ends, and a centrally disposed port therebetween; a mouthpiece communicating with said port of said body and adapted to be removably held in the driver's mouth; separate means removably coupling the other ends of said air supply tube and said air discharge tube to said first and second leg ends, respectively, in communication therewith; and first and second pressure-sensitive unidirectional valves each including a relatively rigid circular valve body having at least one fluid passageway therein and a resilient valve member movably supported from said valve body and normally occupying a fluid-sealing position therewith, said first valve body being removably transversely disposed within said first leg end in fluid-sealing engagement therewith and having its associated valve member on the mouthpiece side thereof, said second valve body being removably transversely disposed within said second leg end in fluid-sealing engagement therewith and having its associated valve member on the air discharge tube side thereof; said first and second valves and said hollow body together defining a compartment from which water may be completely discharged through said second valve into said air discharge tube in response to the application of air pressure to said mouthpiece.*

*18. A system as claimed in claim 17 in which said second valve body has fluid passageway means formed therein extending substantially entirely across said second leg end.*

References Cited in the file of this patent or the original patent

UNITED STATES PATENTS

| | | |
|---|---|---|
| 46,902 | Hawkins | Mar. 21, 1865 |
| 804,272 | Schwarz | Nov. 14, 1905 |
| 1,404,408 | Rosling | Jan. 24, 1922 |
| 2,225,395 | Young | Dec. 17, 1940 |

(Other references on following page)

UNITED STATES PATENTS

| | | |
|---|---|---|
| 2,341,566 | Monro | Feb. 15, 1944 |
| 2,362,643 | Lambertson | Nov. 14, 1944 |
| 2,485,039 | Cousteau | Oct. 18, 1949 |
| 2,682,871 | Arpin | July 6, 1954 |
| 2,764,151 | Cupp | Sept. 25, 1956 |
| 2,792,831 | Gagnan | May 21, 1957 |

FOREIGN PATENTS

| | | |
|---|---|---|
| 372,638 | Great Britain | May 12, 1932 |
| 702,705 | Germany | Feb. 14, 1941 |
| 893,295 | Germany | Oct. 15, 1953 |
| 1,059,236 | France | Nov. 10, 1953 |